Nov. 15, 1938.    G. CROMMEY    2,136,784
FIREPROOF STORAGE COMPARTMENT FOR VEHICLES
Filed Jan. 8, 1938
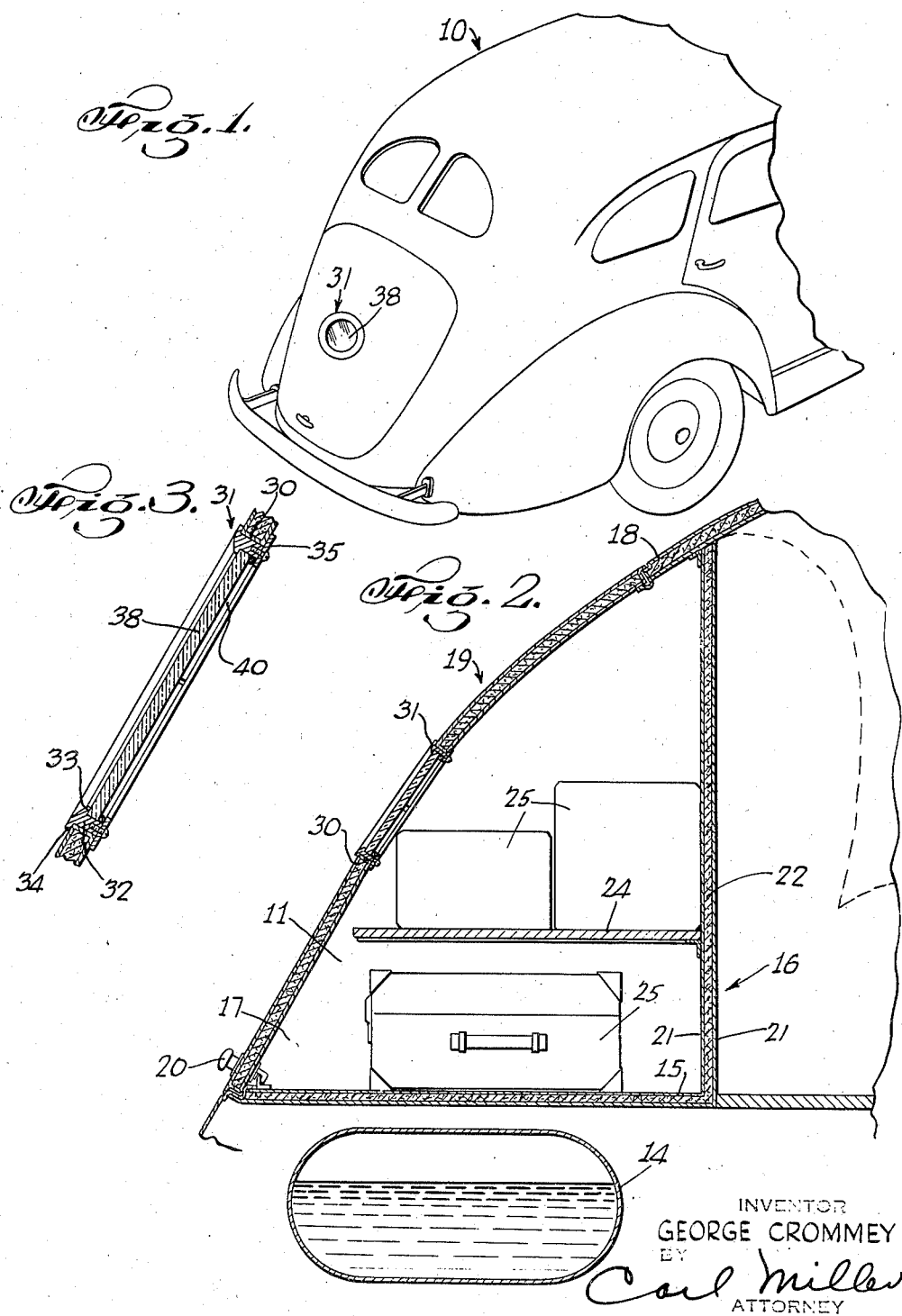
INVENTOR
GEORGE CROMMEY
BY
ATTORNEY Patented Nov. 15, 1938

2,136,784

UNITED STATES PATENT OFFICE 2,136,784

FIREPROOF STORAGE COMPARTMENT FOR VEHICLES

George Crommey, New York, N. Y.

Application January 8, 1938, Serial No. 184,073

1 Claim. (Cl. 296—37)

This invention relates to fireproof compartments for vehicles such as automobiles or busses.

An object of this invention is to provide in a fireproof storage compartment or bulk head for baggage or other articles, safety vent means for allowing any combustion which may break out in the compartment to exhaust itself before reaching the gas tank or spreading to the occupants of the vehicle, and also permitting access to the fire so that the same may be extinguished.

Another object of this invention is to provide a safety vent for a compartment of the character described, normally sealed by a replaceable panel of glass or other material less resistant to fire than the walls of the compartment, and which would crack or would be blown out by combustion within the compartment before the fire could pass through the remainder of the compartment, means being further provided to facilitate replacement should the panel be destroyed.

Yet another object of this invention is to provide a strong, rugged, durable and safe fireproof compartment for an automobile, bus or other vehicle having a safety panel of the character described, which shall be relatively inexpensive to manufacture, easy to replace, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawing, in which is shown one of the various possible illustrative embodiments of this invention, Fig. 1 is a perspective, rear view of a vehicle provided with a fireproof compartment embodying the invention;

Fig. 2 is a longitudinal, vertical, cross-sectional view through my improved compartment; and Fig. 3 is an enlarged, cross-sectional view of the panel on the door, and the mounting therefor.

Referring now in detail to the drawing, 10 designates a vehicle provided with a compartment 11. The vehicle 10 may be of the automobile sedan or bus type.

The compartment 11 is located as usual at the rear of the vehicle directly above the gas tank 14. Said compartment has a bottom wall 15, a front wall 16, side walls 17, and an inclined rear wall 18 provided with a door 19, hinged at the upper end thereof so as to be swung upwardly by means of handle 20.

The walls 15, 16, 17 and 18 and the door 19 may be constructed of inner and outer sheets 21 of metal, between which, are received a layer 22 of fire resisting or retarding material such as asbestos, to render the compartment fireproof. The compartment may be provided with a horizontal shelf 24 of any suitable construction to receive luggage or other materials 25.

Safety vent means is provided to prevent the fire from spreading to the gas tank or to the front of the vehicle, and also permitting access to the fire so that the same may be extinguished. To this end, the door 19 is formed with an opening 30. Within the opening is a ring or frame 31 having a portion 32 within said opening 30, an inwardly projecting flange 33, and an outwardly extending flange 34, contacting the outer surface of the door at said opening.

Attached to the inner edge of the portion 31 is a flat ring 35 parallel to flange 33 and contacting the inner surface of the door and projecting inwardly to said portion 32 to form a groove therewith. Within the frame or ring 31 is a panel 38 of glass or other material having a lower resistance to fire than the walls or door of the compartment 11, and which will crack, melt, or be blown out should a fire or explosion occur within the compartment before the walls of the compartment are destroyed.

The panel 38 contacts the flange 33 of the frame 31. Between the panel 38 and the flat ring 35 is a gasket or ring 40 of resilient material, such as rubber, to hold the panel against the flange 33.

Should a fire break out in the compartment 11, the panel will crack or be blown out or melt before the fire breaks through the walls of the compartment, allowing the fire to exhaust itself within the compartment before reaching the gas tank or the occupants of the car. When the panel 38 is broken, access is permitted to the inside of the compartment so that the fire may be extinguished. The panel 38 is preferably transparent so that the inside of the compartment may be seen therethrough.

It will be noted that should the panel 38 be destroyed, the same may be readily replaced by first removing the flat ring 35 from the frame 31 and removing the gasket 40. A new panel may then be inserted in place, the ring 35 screwed to the frame 31, and gasket 40 pressed into place between the panel and ring.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

In a vehicle, a storage compartment at the rear end thereof characterized by bottom, rear and side walls and an inclined front wall, the latter having a hinged door, each of said walls and said door formed of inner and outer sheets of metal with a layer of fire resisting material intermediate said sheets, said door having an opening, a ring within said opening having an inwardly directed flange and an outwardly directed flange, the latter contracting the exposed surface of the outer sheet of metal of said door, a transparent panel of low fire resisting material resting on and coextensive with the inner surface of said ring and coplanar with said door and positioned in abutting relationship with respect to said inwardly directed flange, and means removably attached to said ring for holding said panel in place and permitting renewal thereof.

GEORGE CROMMEY.